(12) United States Patent
Walker et al.

(10) Patent No.: US 7,964,667 B2
(45) Date of Patent: *Jun. 21, 2011

(54) HIGH TEMPERATURE ELASTOMERS WITH LOW HYDROCARBON VAPOR PERMEABILITY

(75) Inventors: Francis Joseph Walker, Tecumseh, MI (US); Paul J. Hochgesang, Ann Arbor, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 376 days.

This patent is subject to a terminal disclaimer.

(21) Appl. No.: 12/042,140

(22) Filed: Mar. 4, 2008

(65) Prior Publication Data

US 2008/0152925 A1 Jun. 26, 2008

Related U.S. Application Data

(63) Continuation of application No. 11/101,093, filed on Apr. 7, 2005, now Pat. No. 7,348,366.

(51) Int. Cl.
*C08L 27/12* (2006.01)
*C08L 83/08* (2006.01)
(52) U.S. Cl. ........ 525/104; 428/405; 524/424; 524/440; 524/441; 524/462; 528/24; 528/42
(58) Field of Classification Search ..................... None
See application file for complete search history.

(56) References Cited

U.S. PATENT DOCUMENTS

| | | | |
|---|---|---|---|
| 4,263,414 A * | 4/1981 | West | 525/102 |
| 5,457,158 A | 10/1995 | Caporiccio et al. | |
| 5,480,930 A | 1/1996 | Gentle et al. | |
| 5,789,473 A | 8/1998 | Hauenstein et al. | |
| 2005/0187325 A1 | 8/2005 | Yuan et al. | |
| 2006/0041064 A1 | 2/2006 | Gornowicz et al. | |

FOREIGN PATENT DOCUMENTS

| | | |
|---|---|---|
| EP | 0656391 | 6/1995 |
| JP | 56-50948 | 5/1981 |
| JP | 2001-348462 | 12/2001 |
| WO | WO 2005/078182 A1 | 8/2005 |

OTHER PUBLICATIONS

Nagai, Kenji. Figure from "Technical Issues and Counter Measures for FKM," Industrial Material. vol. 44, No. 3, Mar. 1996. pp. 62-65.
Wypoch, George. Handbook of Fillers, Chapter 6: "Chemical Properties of Fillers and Filled Materials" 2nd Edition. ChemTec Publishing, Norwich, NY. 1999. pp. 305, 318-320.

* cited by examiner

*Primary Examiner* — Marc S Zimmer
(74) *Attorney, Agent, or Firm* — Ronald W. Wangerow; Harness, Dickey & Pierce, P.L.C.

(57) ABSTRACT

An elastomer blend is made by admixing fluoroelastomer and fluorinated silicone polymer (with optional filler and/or conductive particulate) into a polymeric admixture in weight ratios to provide a low vaporous hydrocarbon permeation rate and high thermal strain value in thermally robust elastomer cured from the blend. The blend is of especial use for making gaskets for use in high stress conditions at elevated operating temperatures.

12 Claims, 1 Drawing Sheet

HIGH TEMPERATURE ELASTOMERS WITH LOW HYDROCARBON VAPOR PERMEABILITY

CROSS-REFERENCE TO RELATED APPLICATIONS

This application is a continuation application of U.S. patent application Ser. No. 11/101,093 filed Apr. 7, 2005, the disclosure of which is incorporated herein by reference.

This invention relates to thermally robust compression elastomers, and to gaskets made of thermally robust compression elastomers.

Input air gaskets for internal combustion engines have traditionally been formed from silicone polymer. Such silicone gaskets exhibit good robustness and flexibility at operating temperatures in the region of about 150 degrees Celsius. Emerging regulatory requirements, however, require such gaskets to exhibit low permeability to hydrocarbon vapor transmission. Traditional silicone gaskets do not exhibit acceptably low permeability respective to this requirement.

Fluoroelastomer (FKM) materials provide acceptably low permeability to hydrocarbon vapor but exhibit a loss of elastomeric robustness at the operating temperatures of the input air gaskets. This is a problem insofar as air intake gaskets have portions compressed under varying compression loads and, accordingly, need to retain elastomeric robustness in the face of commensurate internal tensions accompanying dramatic shifts in the stress profile of the gasket under compression.

Thus, it is desirable to have a gasket material that does not transmit hydrocarbon vapor and yet maintains elastomeric robustness in prolonged use at air intake temperatures in an internal combustion engine.

SUMMARY

The invention provides a method for making a thermally robust compression elastomer, comprising:
(a) admixing fluoroelastomer and fluorinated silicone polymer into a polymeric admixture; and
(b) curing the polymeric admixture into the compression elastomer;
(c) where the fluoroelastomer and the fluorinated silicone polymer are admixed in a weight ratio such that the compression elastomer has a vaporous hydrocarbon permeation rate value of not greater than 25 gm-mm/m2/day and a thermal strain value of not less than 80 percent at a temperature of not less than 150 degrees Celsius.

In one aspect, thermally robust compression elastomer is provided as made by the above method.

In another aspect, the admixing admixes fluoroelastomer selected from any of
(i) vinylidene fluoride/hexafluoropropylene copolymer fluoroelastomer having at least one cure site monomer and from about 66 weight percent to about 68 weight percent fluorine,
(ii) vinylidene fluoride/perfluoromethylvinyl ether/tetrafluoroethylene terpolymer fluoroelastomer having at least one cure site monomer, from about 7 to about 20 weight percent tetrafluoroethyl blocks, from about 35 to about 40 weight percent perfluoromethylvinylidyl ether blocks, from about 40 to about 58 weight percent vinylidyl fluoride blocks, and from about 64 weight percent to about 67 weight percent fluorine,
(iii) tetrafluoroethylene/ethylene/perfluorovinyl ether terpolymer fluoroelastomer having at least one cure site monomer and from about 66 weight percent to about 69 weight percent fluorine,
(iv) vinylidene fluoride/hexafluoropropylene/tetrafluoroethylene terpolymer fluoroelastomer having at least one cure site monomer and from about 66 weight percent to about 70 weight percent fluorine,
(v) tetrafluoroethylene/propylene copolymer fluoroelastomer having at least one cure site monomer and from about 57 weight percent to about 58 weight percent fluorine,
(vi) tetrafluoroethylene/perfluorovinyl ether copolymer fluoroelastomer having at least one cure site monomer and corresponding to the formula

[-TFEq-HFPr-VdFs-]d or
(vii) combinations of these, where TFE is essentially a tetrafluoroethyl block, HFP is essentially a hexfluoropropyl block, VdF is essentially a vinylidyl fluoride block, and products qd and rd and sd collectively provide proportions of TFE, HFP, and VdF whose values are within element 101 of FIG. 1.

In another aspect, the admixing admixes sufficient fluorinated silicone polymer such that the polymeric admixture has from about 5 to about 50 weight percent of fluorinated silicone polymer.

In yet another aspect, the admixing admixes sufficient fluorinated silicone polymer such that the polymeric admixture has from about 13 to about 15 weight percent of fluorinated silicone polymer.

In yet another aspect, the admixing admixes fluorinated silicone polymer comprising from about 1 to about 43 weight percent fluorine. In one case, the admixing admixes fluorinated silicone polymer comprising at least one trifluoro n-propyl functional group connected to a silicone polymer chain.

In a further aspect, the admixing admixes fluoroelastomer comprising at least one peroxide-curable cure site monomer. In yet a further aspect, the admixing admixes triallylisocyanate into the polymeric admixture to provide a curing agent for the curing operation.

In yet a further aspect, the fluorinated silicone polymer has a Williams plasticity of from about 250 to about 300. In another aspect, the fluoroelastomer has a Mooney viscosity of from about 5 to about 50.

In another aspect, the curing operation involves heating the polymeric admixture to a temperature of from about 18 to about 200 degrees Celsius.

In one aspect, filler and a functional silane are admixed into the polymeric admixture where the functional silane is admixed to comprise from about 0.01 to about 5 weight percent of the polymeric admixture, and the filler is any of fiberglass particulate, inorganic fiber particulate, carbon fiber particulate, ground rubber particulate, polytetrafluorinated ethylene particulate, microspheres, carbon nanotubes, or combinations of these. In one aspect of this, individual particles of the filler are coated, prior to the admixing, with a coating (such as a functional silane) to provide coated filler particles for admixing as the filler into the admixture, where the individual particles have a first surface tension between the individual particles and the fluoroelastomer, the coated filler particles have a second surface tension between the coated filler particles and the fluoroelastomer, and the second surface tension is less than the first surface tension.

In a similar alternative aspect, conductive particulate and a functional silane are admixed into the admixture to comprise from about 0.01 to about 5 weight percent of the admixture where the conductive particulate is any of conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, or combinations of these. The conductive particulate is also optionally coated to facilitate admixing as described above for the filler.

In one aspect, the invention provides a gasket of cured elastomer cured from a polymeric admixture of fluoroelastomer and fluorinated silicone polymer where the gasket has a vaporous hydrocarbon permeation rate value of not greater than 25 gm-mm/m2/day, and a thermal strain value of not less than 80 percent at a temperature of not less than 150 degrees Celsius.

In another aspect, the invention provides a method for making a gasket (and/or a gasket made by the method), comprising:
(a) admixing fluoroelastomer and fluorinated silicone polymer into a polymeric admixture;
(b) forming the polymeric admixture into a gasket precursor (in one case by injection molding of the polymeric admixture); and curing the gasket precursor into the gasket;
(d) where the fluoroelastomer and the fluorinated silicone polymer are admixed in a weight ratio such that the gasket has a vaporous hydrocarbon permeation rate value of not greater than 25 gm-mm/m2/day and a thermal strain value of not less than 80 percent at a temperature of not less than 150 degrees Celsius.

In another aspect, an elastomer blend is provided of: from about 50 to about 93 weight percent fluoroelastomer from about 6 to about 50 weight percent fluorinated silicone polymer; from about 1 to about 50 weight percent particulated material; and from about 0.01 to about 5 weight percent functional silane; where the fluoroelastomer and the fluorinated silicone polymer are admixed in the elastomer blend such that compression elastomer cured from the elastomer blend has a vaporous hydrocarbon permeation rate value of not greater than 25 gm-mm/m2/day and a thermal strain value of not less than 80 percent at a temperature of not less than 150 degrees Celsius. In one aspect, elastomer cured from this elastomer blend is also provided by the invention.

Further areas of applicability will become apparent from the detailed description provided hereinafter. It should be understood that the detailed description and specific examples, while indicating embodiments of the invention, are intended for purposes of illustration only and are not intended to limit the scope of the invention.

Figure 1:
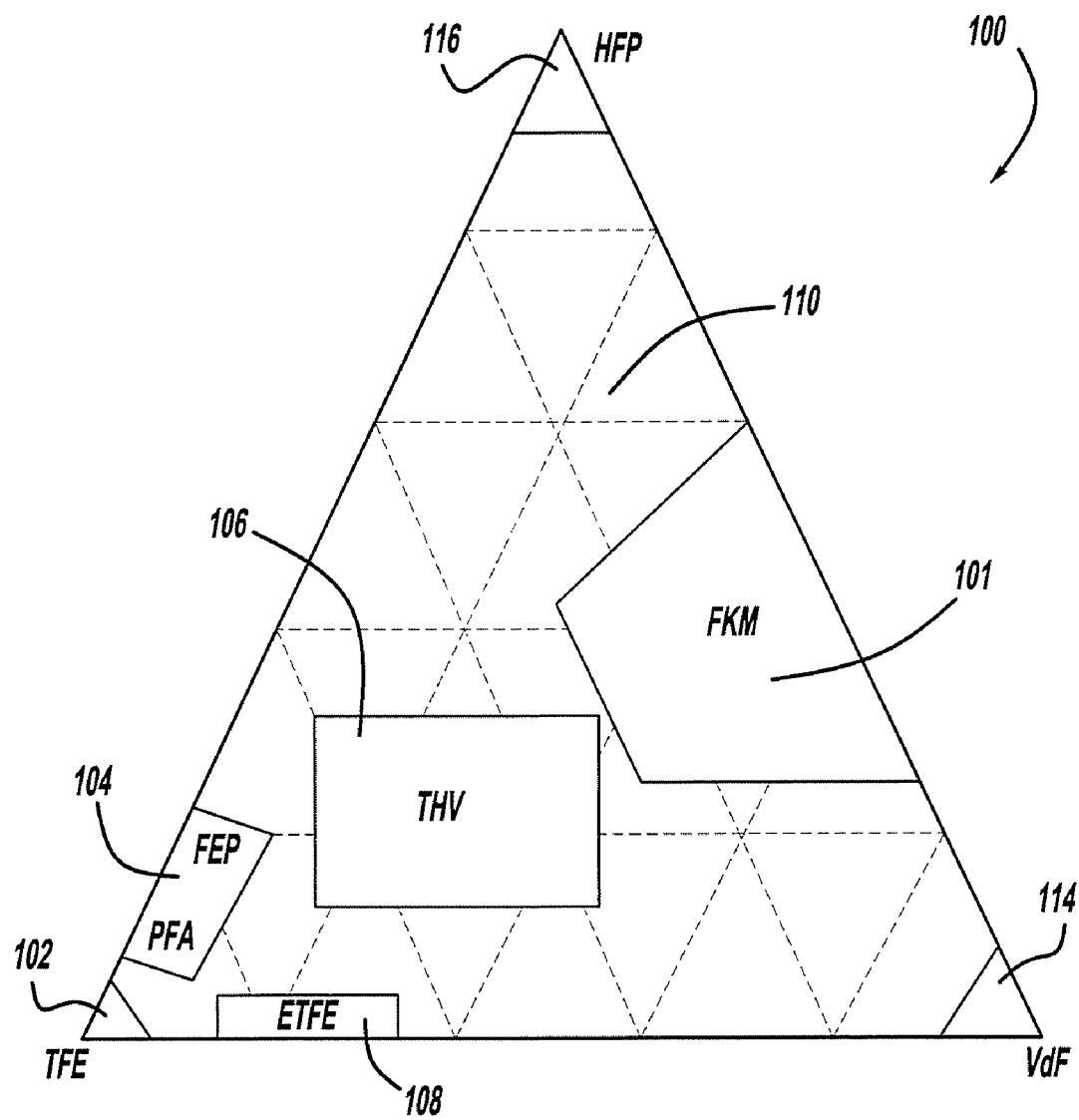
FIG. 1 presents a ternary composition diagram for tetrafluoroethylene (TFE), hexfluoropropylene (HFP), and vinylidene fluoride blends.

It should be noted that the FIGURE set forth herein is intended to exemplify the general characteristics of an apparatus, a material, and/or a method among those of this invention, for the purpose of the description of such embodiments herein. This FIGURE may not precisely reflect the characteristics of any given embodiment, and is not necessarily intended to define or limit specific embodiments within the scope of this invention.

DESCRIPTION

The following definitions and non-limiting guidelines must be considered in reviewing the description of this invention set forth herein.

The headings (such as "Introduction" and "Summary") and sub-headings used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include" and its variants is intended to be non-limiting, such that recitation of items in a list is not to the exclusion of other like items that may also be useful in the materials, compositions, devices, and methods of this invention.

Most items of manufacture represent an intersection of considerations in both mechanical design and in materials design. In this regard, improvements in materials frequently are intertwined with improvements in mechanical design. The embodiments describe compounds, compositions, assemblies, and manufactured items that enable improvements in polymer material synthesis to be fully exploited.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

The embodiments relate to cured polymeric admixtures of fluoroelastomer polymer and fluorinated silicone polymer.

Carbon-chain-based polymeric materials (polymers) are usefully defined as falling into one of three traditionally separate generic primary categories: thermoset materials (one type of plastic), thermoplastic materials (a second type of plastic), and elastomeric (or rubber-like) materials (elastomeric materials are not generally referenced as being "plastic" insofar as elastomers do not provide the property of a solid "finished" state). An important measurable consideration with respect to these three categories is the concept of a melting point—a point where a solid phase and a liquid phase of a material co-exist. In this regard, a thermoset material essentially cannot be melted after having been "set" or "cured" or "cross-linked." Precursor component(s) to the thermoset plastic material are usually shaped in molten (or essentially liquid) form, but, once the setting process has executed, a melting point essentially does not exist for the material. A thermoplastic plastic material, in contrast, hardens into solid form (with attendant crystal generation), retains its melting point essentially indefinitely, and re-melts (albeit in some cases with a certain amount of degradation in general polymeric quality) after having been formed. An elastomeric (or rubber-like) material does not have a melting point; rather, the elastomer has a glass transition temperature where the polymeric material demonstrates an ability to usefully flow, but without co-existence of a solid phase and a liquid phase at a melting point.

Elastomers are frequently transformed into very robust flexible materials through the process of vulcanization. Depending upon the degree of vulcanization, the glass transition temperature may increase to a value that is too high for any practical attempt at liquefaction of the vulcanizate. Vulcanization implements inter-bonding between elastomer chains to provide an elastomeric material more robust against deformation than a material made from the elastomers in their pre-vulcanized state. In this regard, a measure of performance denoted as a "compression set value" is useful in measuring the degree of vulcanization ("curing", "cross-linking") in the elastomeric material. For the initial elastomer, when the material is in non-vulcanized elastomeric form, a non-vulcanized compression set value is measured according to ASTM D395 Method B and establishes thereby an initial compressive value for the particular elastomer. Under extended vulcanization, the elastomer vulcanizes to a point where its compression set value achieves an essentially constant maximum respective to further vulcanization, and, in so doing, thereby defines a material where a fully vulcanized compression set value for the particular elastomer is measurable. In applications, the elastomer is vulcanized to a compression set value useful for the application.

In one embodiment a fluorinated silicone is provided with a trifluoro n-propyl functional group connected to a silicone polymer chain according to the following structural formula. Formula I:

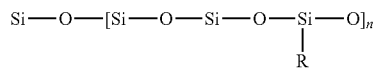

where R is an n-propyl functional group [—C—C—CF$_3$] and n is sufficient to provide a polymer having a Williams plasticity of from about 250 to about 300 and a sufficient set of R groups are provided to enable a fluorinated weight ratio within the fluorinated silicone of from about 1 to about 43 weight percent.

The fluorinated silicone polymer is preferably based upon a trifluoro n-propyl functional group insofar as fluorinated methyl or vinyl functional groups are encumbered by stearic hindrance, and fluorinated butyl (or higher) functional groups provide fluorinated silicones having an unacceptably elevated viscosity for convenient use in gasket forming.

The fluorinated elastomer (fluoroelastomer) preferably is any of
(i) vinylidene fluoride/hexafluoropropylene copolymer fluoroelastomer having at least one cure site monomer and from about 66 weight percent to about 68 weight percent fluorine,
(ii) vinylidene fluoride/perfluoromethylvinyl ether/tetrafluoroethylene terpolymer fluoroelastomer having at least one cure site monomer, from about 7 to about 20 weight percent tetrafluoroethyl blocks, from about 35 to about 40 weight percent perfluoromethylvinylidyl ether blocks, from about 40 to about 58 weight percent vinylidyl fluoride blocks, and from about 64 weight percent to about 67 weight percent fluorine,
(iii) tetrafluoroethylene/ethylene/perfluorovinyl ether terpolymer fluoroelastomer having at least one cure site monomer and from about 66 weight percent to about 69 weight percent fluorine,
(iv) vinylidene fluoride/hexafluoropropylene/tetrafluoroethylene terpolymer fluoroelastomer having at least one cure site monomer and from about 66 weight percent to about 70 weight percent fluorine,
(v) tetrafluoroethylene/propylene copolymer fluoroelastomer having at least one cure site monomer and from about 57 weight percent to about 58 weight percent fluorine,
(vi) tetrafluoroethylene/perfluorovinyl ether copolymer fluoroelastomer having at least one cure site monomer and corresponding to the following formula.

$$[-TFE_q-HFP_r-VdF_s-]_d \qquad \text{Formula II}$$

or
(vii) combinations of these,
where TFE is essentially a tetrafluoroethyl block, HFP is essentially a hexfluoropropyl block, VdF is essentially a vinylidyl fluoride block, and products qd and rd and sd collectively provide proportions of TFE, HFP, and VdF whose values are within element 101 of FIG. 1 (as described in the next paragraph).

Turning now to FIG. 1, a ternary composition diagram 100 is presented showing tetrafluoroethylene (TFE), hexfluoropropylene (HFP), and vinylidene fluoride weight percentage combinations for making various co-polymer blends. Region 101 defines blends of respective tetrafluoroethyl, hexfluoropropyl, and vinylidyl fluoride overall block amounts that combine to form fluoroelastomer (FKM) polymers. Region 104 defines blends of respective tetrafluoroethyl, hexfluoropropyl, and vinylidyl fluoride overall block amounts that combine to form perfluoroalkoxy tetrafluoroethylene/perfluoromethylvinyl ether and tetrafluoroethylene/hexafluoropropylene polymers. Region 106 defines blends of respective tetrafluoro-ethyl, hexfluoropropyl, and vinylidyl fluoride overall block amounts that combine to form tetrafluoroethylene/hexafluoropropylene/vinylidene fluoride polymers. Region 108 defines blends of respective tetrafluoroethyl, hexfluoropropyl, and vinylidyl fluoride overall block amounts that combine to form ethylene tetrafluoroethylene polymers. Region 110 defines blends of respective tetrafluoroethyl, hexfluoropropyl, and vinylidyl fluoride overall block amounts that traditionally have not generated useful co-polymers. Region 102 defines blends of respective tetrafluoroethyl, hexfluoropropyl, and vinylidyl fluoride overall block amounts that combine to form polytetrafluoroethylene (PTFE) polymers. Region 114 defines blends of respective tetrafluoroethyl, hexfluoropropyl, and vinylidyl fluoride overall block amounts that combine to form polyvinylidene fluoride (PVdF) polymers. Region 116 defines blends of respective tetrafluoroethyl, hexfluoropropyl, and vinylidyl fluoride overall block amounts that combine to form polyhexfluoropropylene (PHFP) polymers. The Fluoroelastomer is also preferably provided with at least one peroxide curable cure site monomer (preferably a plurality of peroxide curable cure site monomers).

Using an above-described fluorinated silicone polymer and an above-described fluoroelastomer, a thermally robust compression elastomer embodiment is made by admixing the fluoroelastomer and the fluorinated silicone polymer into a polymeric admixture and then curing the polymeric admixture into the desired compression elastomer. The fluoroelastomer and fluorinated silicone polymer are admixed in a weight ratio such that the resulting compression elastomer has a vaporous hydrocarbon permeation rate of not greater than 25 gm-mm/m2/day and a thermal strain of not less than 80 percent at a temperature of not less than 150 degrees Celsius. In one embodiment, a curing agent such as triallylisocyanate is also admixed into the polymeric admixture to provide a curing agent. Curing is effected by elevating the temperature of the admixed fluoroelastomer, fluorinated silicone polymer, and triallylisocyanate curing agent to from about 118 to about 200 degrees Celsius (preferably from about 350 to about 360 degrees Fahrenheit) for a time sufficient to enable curing. In an alternative speculative embodiment, curing is effected without use of a curing agent by use of a radiation source such as an electron beam in a manner similar to that described in U.S. patent application Ser. No. 10/881,106 filed on Jun. 30, 2004 and entitled ELECTRON BEAM INTER-CURING OF PLASTIC AND ELASTOMER BLENDS, issued Apr. 21, 2009 as U.S. Pat. No. 7,521,508 and incorporated by reference herein.

In yet another alternative speculative embodiment, curing is effected with a curing agent and by use of a radiation source such as an electron beam at a temperature below 200 degrees Celsius.

After curing, it is believed that the compounds of fluoroelastomer and Formula I link together, in one embodiment where triallylisocyanate curing agent enhances curing of the polymeric admixture, across a residue of the triallylisocyanate curing agent to provide, in one perspective, a molecular chimera (bi-modal molecule) where one portion is fluoroelastomeric in its fundamental nature and a second portion is a silicone elastomer in its fundamental nature. The bi-modal molecule therefore provides a blend of the desirable properties of fluoroelastomers (specifically, good resistance to hydrocarbon permeation; more specifically, a vaporous hydrocarbon permeation rate value of not greater than 25 gm-mm/m2/day) and fluorinated silicones (specifically, robustness under strain at high temperature; more specifically, a thermal strain value of not less than 80 percent at a temperature of not less than 150 degrees Celsius).

The vaporous hydrocarbon permeation rate value is determined according to ASTM D-814. The thermal strain value is determined according to ASTM D-412.

In one embodiment, filler (particulate material contributing to the performance properties of the compounded polymeric material respective to such properties as, without limitation, bulk, weight, and/or viscosity while being essentially chemically inert or essentially reactively insignificant respective to chemical reactions within the compounded polymer) is also admixed into the formulation. The filler particulate is any material such as, without limitation, fiberglass particulate, inorganic fiber particulate, carbon fiber particulate, ground rubber particulate, or polytetrafluorinated ethylene particulate having a mean particle size from about 5 to about 50 microns; fiberglass, ceramic, or glass microspheres preferably having a mean particle size from about 5 to about 120 microns; carbon nanotubes; or combinations thereof.

In one embodiment, dispersed conductive particulate is admixed into the polymeric admixture to provide an electrically conductive polymeric admixture. This dispersed conductive particulate is made of a plurality of conductive particles dispersed in the polymeric admixture. The conductive particles used in alternative embodiments include conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, or combinations thereof.

A functional silane such as vinyltriethoxysilane (or a blend of functional silanes) in from about 0.01 to about 5 weight percent of the polymeric admixture is also optionally admixed into the polymeric admixture when either or both of dispersed conductive particulate or filler is added to the polymer admixture. In this regard, the functional silane (preferably, vinyltriethoxysilane) appears to augment bonding between dispersed particulate and fluoroelastomer (or fluoroelastomeric moieties) in the cured polymeric admixture, with commensurate benefits to overall properties of an article (such as a gasket) derived from the cured polymeric admixture.

A formulated embodiment of an elastomer blend made with particulated material such as dispersed conductive particulate and/or filler includes
  (a) from about 50 to about 93 weight percent fluoroelastomer;
  (b) from about 6 to about 50 weight percent fluorinated silicone polymer;
  (c) from about 1 to about 50 weight percent particulated material; and
  (d) from about 0.01 to about 5 weight percent vinyltriethoxysilane.

In this embodiment, the fluoroelastomer and the fluorinated silicone polymer are admixed in the elastomer blend such that compression elastomer cured from the elastomer blend has a vaporous hydrocarbon permeation rate value of not greater than 25 gm-mm/m2/day and a thermal strain value of not less than 80 percent at a temperature of not less than 150 degrees Celsius.

In one embodiment, the precured polymeric admixture has from about 5 to about 50 (more preferably 13 to 15) weight percent of fluorinated silicone polymer. In one embodiment, the fluorinated silicone polymer is from about 1 to about 43 weight percent fluorine, with a preferred amount of about 43 weight percent.

Turning now to admixing method embodiments for making polymeric admixture embodiments discussed in the foregoing, one method embodiment for making a material compound embodiment is to admix the fluoroelastomer and the fluorinated silicone polymer (with a conventional mixing system such as a batch polymer mixer, a roll mill, a continuous mixer, a single-screw mixing extruder, a twin-screw extruder mixing extruder, or the like) until the elastomer gum polymer system has been fully admixed. Specific commercial batch polymer mixer systems in this regard include any of a Moriyama mixer, a Banbury mixer, and a Brabender mixer. Conductive particulate and/or filler, if used, are then admixed into the polymer admixture until fully dispersed so that an electrically conductive elastomer blend or a filler-enhanced elastomer blend is available for forming into an article. In one embodiment, the fluoroelastomer, fluorinated silicone polymer, and the optional conductive (and optional filler) particulate are simultaneously admixed with a conventional mixing system such as a roll mill, continuous mixer, a single-screw mixing extruder, a twin-screw extruder mixing extruder, and the like until the particulated material has been fully admixed. In one embodiment, a curing agent (for example, triallylisocyanate) is admixed into the polymeric admixture shortly before use, the polymeric admixture is then formed (for example by an injection molding process) into a useful article (such as a gasket) precursor, and the temperature of the formed precursor is raised (for example, to a temperature of from about 118 to about 200 degrees Celsius—preferably from about 350 to about 360 degrees Fahrenheit) to cure the precursor. In another contemplated embodiment, the polymeric admixture system is molded into an article precursor and the molded precursor is cured with radiation to yield the desired article.

In a preferred embodiment, a coating is applied to the optional conductive particles or filler, prior to the admixing, with a coating to provide coated conductive particles or coated filler particles as the conductive particulate or filler. In this regard, given that uncoated particles (uncoated conductive particles and/or uncoated filler particles) have a (first) surface tension between the uncoated particles and fluoroelastomer in the polymeric admixture, the coating is chosen so that the coated particles have a (second) surface tension between the coated particles (coated conductive particles and/or coated filler particles) and the fluoroelastomer in the polymeric admixture that is less than the first surface tension. The coating is applied to enable expedited admixing of the particulate into a fully dispersion within the continuous polymer phase of the elastomer gum polymer system. In one embodiment, the coating is a functional silane (preferably, vinyltriethoxysilane).

The embodiments provide a composition whereby the elevated mechanical properties of a fluorocarbon-based elastomeric composition is improved by the addition of a lower fluorine containing, non-carbon backbone polymer (e.g. fluorosilicone). The addition of the fluorosilicone improves the hot strain at brake to a value in excess of 10% above the value anticipated when testing a traditional fluoroelastomer. An added benefit is that the molding characteristics are also improved (respective to traditional fluoroelastomers) through (a) improved flow during molding, (b) reduced injection time during injection molding, (c) reduced injection pressure during injection molding, (d) improved release from mold cavities, and, in some instances, (e) reduced mold fouling. Cured composition embodiments further prosesses low fuel permeation characteristics and low compression set and improved hydrocarbon fuel resistance compared to convention fluorosilicone compositions. The embodiments include use of interblends of any peroxide crosslinkable fluorocarbon polymer and any fluorosilicone where from about 10 to about 90 weight percent of the interblend is fluorosilicone, and are conveniently processed using injection molding, transfer molding, compression molding and extrusion processes.

EXAMPLES

Example 1

Two polymeric admixtures (Test Blend A and Test Blend B) of 85 weight percent fluoroelastomer and 15 weight percent fluorosilicone are prepared and cured using the same fluoroelastomer according to Table 1. A control sample of essentially pure fluoroelastomer is also prepared of the same fluoroelastomer used for the two polymeric admixtures. Tensile strength, modulus, heat aging, fluid resistance, hydrocarbon vapor permeation, and elevated temperature strain are all measured as indicated in Table 1 for the two fluoroelastomer/fluorosilicone blend samples and compared to measurements for the control fluoroelastomer. The results clearly indicate that the cured and tested fluoroelastomer/fluorosilicone admixtures show superior high temperature strain properties over the control fluoroelastomer and that the penalty to permeation of the cured and tested fluoroelastomer/fluorosilicone admixtures is not significantly diminished respective to the control fluoroelastomer.

TABLE 1

| Original properties (ASTM D412) | Control fluoro-elastomer | Test blend A | Test blend B |
|---|---|---|---|
| Tensile strength Mpa | 10.97 | 10.19 | 10.18 |
| Modulus @ 50% MPa | 2.23 | 2.19 | 1.85 |
| Modulus @ 100% MPa | 3.85 | 3.63 | 3.02 |
| Modulus @ 200% MPa | 6.16 | 5.33 | 6.33 |
| Elongation % | 349 | 396 | 386 |
| Hardness, Shore A | 70 | 70 | 68 |
| Specific Gravity | 2.07 | 1.98 | — |
| Tear Strength, kN/m | 18.07 | 18.37 | — |
| Compression Set 70 h @ 150 C. | 11 | 14 | 17 |
| Heat Age ASTM D573 1008 h @ 175 degrees C. | | | |
| Change in Tensile Strength, % | −12 | −43 | — |
| Change in 50% Modulus, % | 7 | 19 | — |
| Change in 100% Modulus, % | 26 | 10 | — |
| Change in 200% Modulus, % | 40 | 6 | — |
| Change in Elongation, % | −31 | −47 | — |
| Change in Hardness, Shore A, pts | 4 | 4 | — |
| Fluid Immersions ASTM D471 504 h @ 150 degrees C. | | | |
| Change in Tensile Strength, % | −13 | −45 | — |
| Change in 50% Modulus, % | 39 | 24 | — |
| Change in 100% Modulus, % | 69 | 25 | — |
| Change in 200% Modulus, % | — | — | — |
| Change in Elongation, % | −55 | −61 | — |
| Change in Hardness, Shore A, pts | 3 | 3 | — |
| Change in Volume % | 0 | 1 | — |
| Fluid Immersions Mobil 1 oil 504 h @ 150 degrees C. | | | |
| Change in Tensile Strength, % | −6 | −19 | — |
| Change in 50% Modulus, % | 5 | 6 | — |
| Change in 100% Modulus, % | 27 | 17 | — |
| Change in 200% Modulus, % | 42 | 24 | — |
| Change in Elongation, % | −28 | −26 | — |
| Change in Hardness, Shore A, pts | −1 | −2 | — |
| Change in Volume % | 2 | 1 | — |
| Fluid Immersions fuel 168 h @ 150 degrees C. | | | |
| Change in Tensile Strength, % | −32 | −28 | −16 |
| Change in 50% Modulus, % | −6 | −14 | −19 |
| Change in 100% Modulus, % | −5 | −11 | −13 |
| Change in 200% Modulus, % | −7 | −8 | −2 |
| Change in Elongation, % | −22 | −16 | −22 |
| Change in Hardness, Shore A, pts | −8 | −6 | −8 |
| Change in Volume % | 13 | 15 | 15 |
| CSR Force Retention Ft/Fo % | | | |
| 1008 hours @ 150 degrees C. in air | 48 | 31 | — |
| 1008 hours @ 150 degrees C. in SF105G | 49 | 38 | — |
| 1008 hours @ 125 degrees C. in 50/50 formulated ethylene glycol/DI water | — | 29 | — |
| Permeation gm/$m^2$/day | 2-5 est | 15.9 | — |
| Hot temperature strain test | | | |
| Lab 1 (@ 177 degrees C.) | 72 | 99 | — |
| Lab 2 (@ 150 degrees C.) | — | 85.9 | 109.3 |

The examples and other embodiments described herein are exemplary and not intended to be limiting in describing the full scope of compositions and methods of this invention.

Equivalent changes, modifications and variations of specific embodiments, materials, compositions and methods may be made within the scope of the present invention, with substantially similar results.

What is claimed is:

1. A gasket, comprising:
   (a) cured elastomer cured from a polymeric admixture of fluoroelastomer and fluorinated silicone polymer, the fluorinated silicone comprising a polysiloxane having a Williams plasticity of between about 250 and about 300, and that comprises 3,3,3-trifluoropropyl groups in a sufficient number to provide between about 1 to about 43 weight percent fluorine in the polymer;
   (b) wherein said gasket has a vaporous hydrocarbon permeation rate value of not greater than 25 gm-mm/m$^2$/day, determined according to ASTM D-814, and a thermal strain value of not less than 80 percent at a temperature of not less than 150 degrees Celsius, determined according to ASTM D-412.

2. The gasket of claim 1 wherein said fluoroelastomer is selected from the group consisting of
   (i) vinylidene fluoride/hexafluoropropylene copolymer fluoroelastomer having at least one cure site monomer and from about 66 weight percent to about 68 weight percent fluorine,
   (ii) vinylidene fluoride/perfluoromethylvinyl ether/tetrafluoroethylene terpolymer fluoroelastomer having at least one cure site monomer, from about 7 to about 20 weight percent tetrafluoroethyl blocks, from about 35 to about 40 weight percent perfluoromethylvinylidyl ether blocks, from about 40 to about 58 weight percent vinylidyl fluoride blocks, and from about 64 weight percent to about 67 weight percent fluorine,
   (iii) tetrafluoroethylene/ethylene/perfluorovinyl ether terpolymer fluoroelastomer having at least one cure site monomer and from about 66 weight percent to about 69 weight percent fluorine,
   (iv) vinylidene fluoride/hexafluoropropylene/tetrafluoroethylene terpolymer fluoroelastomer having at least one cure site monomer and from about 66 weight percent to about 70 weight percent fluorine,
   (v) tetrafluoroethylene/propylene copolymer fluoroelastomer having at least one cure site monomer and from about 57 weight percent to about 58 weight percent fluorine,
   (vi) tetrafluoroethylene/perfluorovinyl ether copolymer fluoroelastomer having at least one cure site monomer and corresponding to the formula

and
   (vii) combinations thereof,
   (viii) wherein TFE is essentially a tetrafluoroethyl block, HFP is essentially a hexfluoropropyl block, VdF is essentially a vinylidyl fluoride block, and products qd and rd and sd collectively provide proportions of TFE, HFP, and VdF whose values are within element 101 of FIG. 1.

3. The gasket of claim 1, wherein said fluorinated silicone polymer comprises from about 5 to about 50 weight percent of said polymeric admixture.

4. The gasket of claim 3 wherein said fluorinated silicone polymer comprises from about 13 to about 15 weight percent of said polymeric admixture.

5. The gasket of claim 1 wherein said fluoroelastomer comprises at least one peroxide-curable cure site monomer.

6. The gasket of claim 1 wherein said cured polymeric admixture is cured at a temperature of from about 118 to about 200 degrees Celsius from an admixture of said fluoroelastomer, said fluorinated silicone polymer, triallylisocyanate, and a curing agent.

7. The gasket of claim 1 wherein said fluoroelastomer has a Mooney viscosity of from about 5 to about 50.

8. The gasket of claim 1 wherein said polymeric admixture further comprises filler and a functional silane, said functional silane comprising from about 0.01 to about 5 weight percent of said polymeric admixture, said filler selected from the group consisting of fiberglass particulate, inorganic fiber, carbon fiber, ground rubber particulate, polytetrafluorinated ethylene particulate, microspheres, carbon nanotubes, and combinations thereof.

9. The gasket of claim 1 wherein said polymeric admixture further comprises conductive particulate and a functional silane, said functional silane comprising from about 0.01 to about 5 weight percent of said polymeric admixture, said conductive particulate selected from the group consisting of conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, and combinations thereof.

10. The gasket of claim 1 wherein said polymeric admixture further comprises an inorganic fiber filler.

11. An elastomer gasket cured from a polymeric admixture, the polymeric admixture comprising:
    (a) a fluoroelastomer comprising at least one peroxide-curable cure site monomer;
    (b) a fluorinated silicone polymer comprising a polysiloxane having a Williams plasticity of between about 250 and about 300, and that comprises between about 1 to about 43 weight percent fluorine in the polymer; and
    (c) an inorganic fiber filler;
    wherein said gasket has a vaporous hydrocarbon permeation rate value of not greater than 25 gm-mm/m$^2$/day, determined according to ASTM D-814, and a thermal strain value of not less than 80 percent at a temperature of not less than 150 degrees Celsius, determined according to ASTM D-412.

12. The elastomer gasket of claim 11 wherein said fluorinated silicone polymer comprises at least one trifluoro n-propyl functional group connected to a silicone polymer chain.

* * * * *